Oct. 7, 1947.  A. NELSON  2,428,677
FISH SCARING DEVICE
Filed Sept. 26, 1944  3 Sheets-Sheet 1
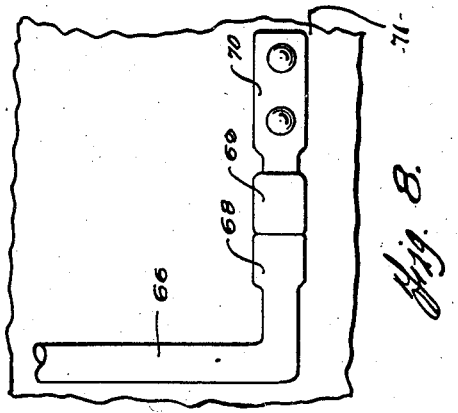
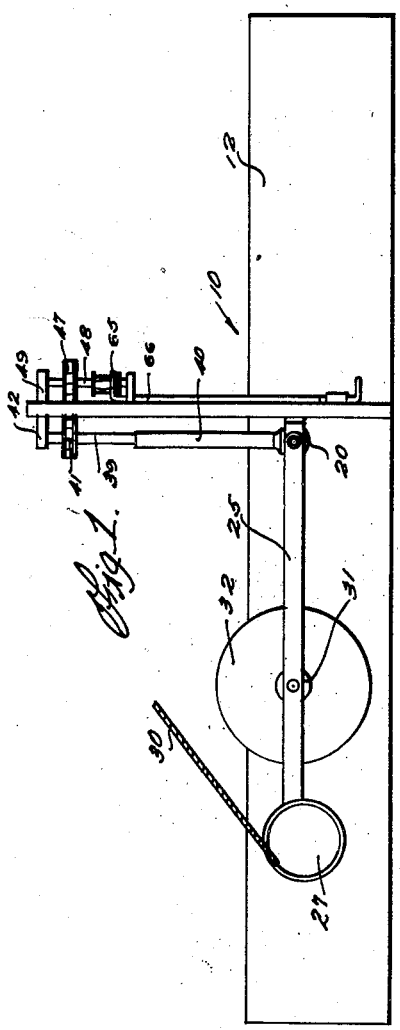
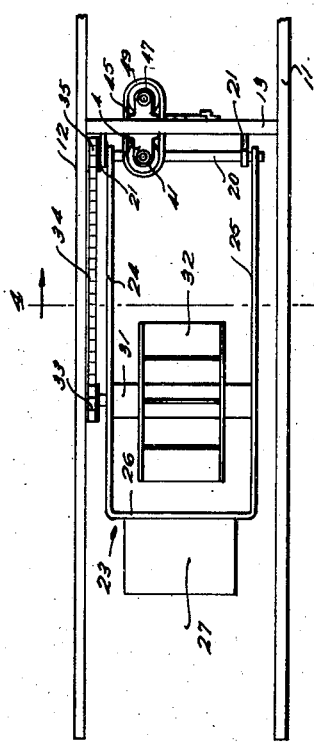
Inventor
Alfred Nelson Oct. 7, 1947.   A. NELSON   2,428,677
FISH SCARING DEVICE
Filed Sept. 26, 1944   3 Sheets-Sheet 2
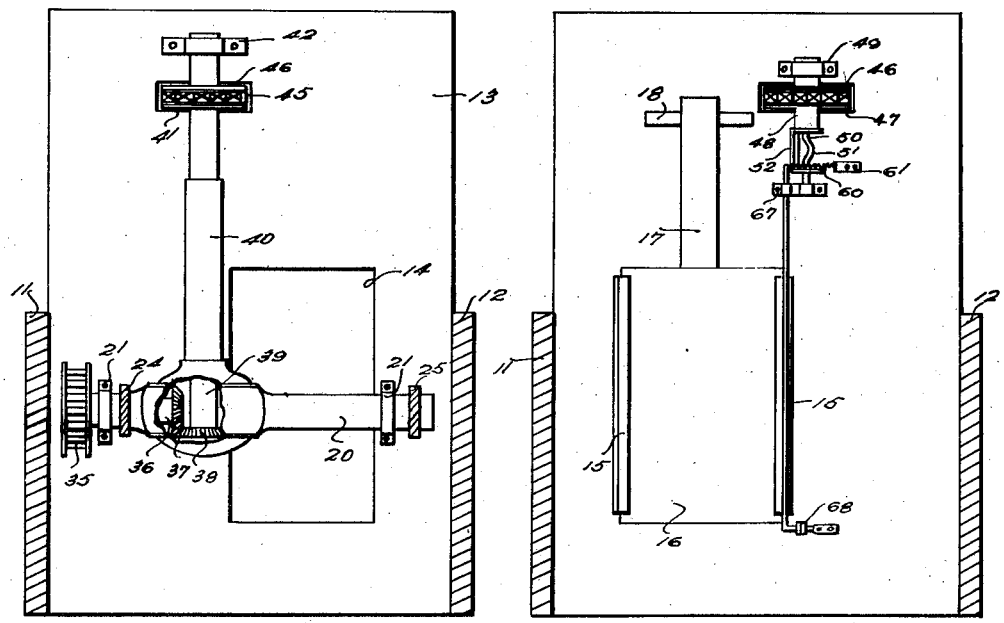
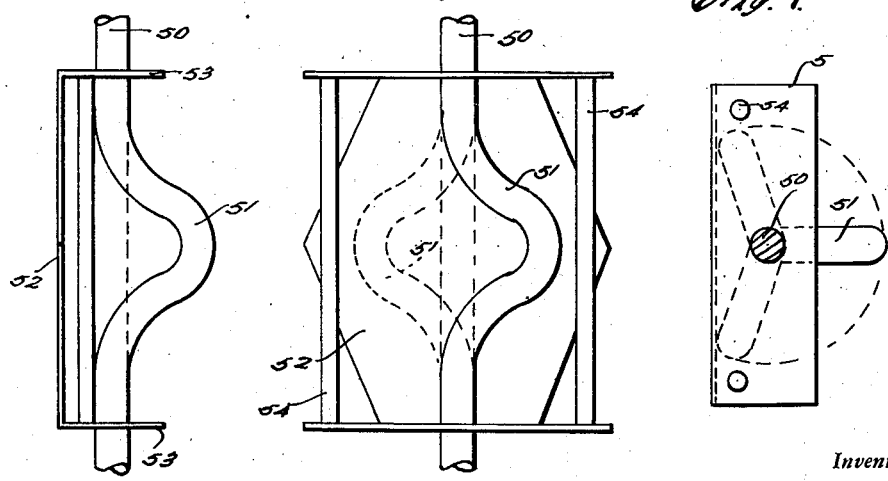
Inventor
Alfred Nelson

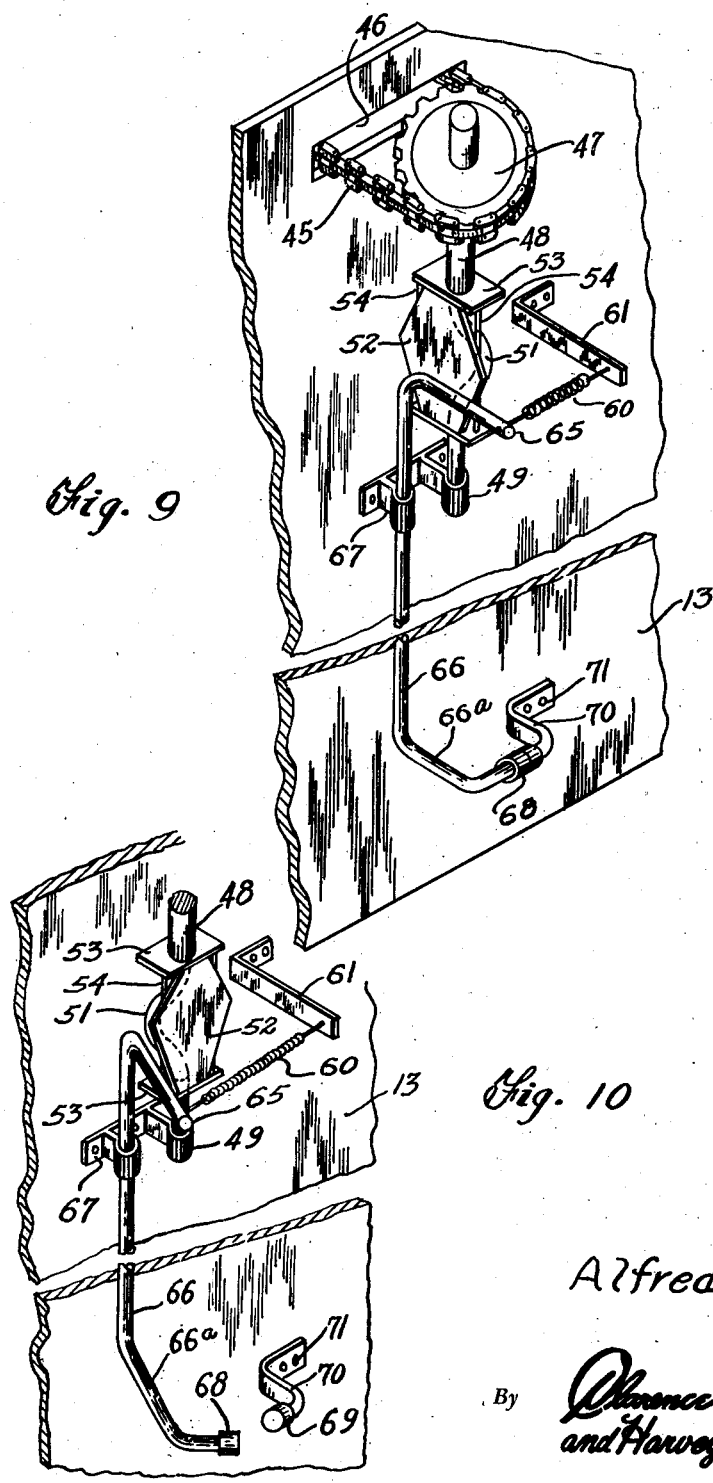

Patented Oct. 7, 1947

2,428,677

UNITED STATES PATENT OFFICE 2,428,677

FISH SCARING DEVICE

Alfred Nelson, Columbus, Mont.

Application September 26, 1944, Serial No. 555,839

1 Claim. (Cl. 116—22)

This invention relates to an apparatus for controlling the movements of fish, and more particularly to such an apparatus designed to preclude passage of fish into certain restricted areas.

A primary object of this invention is the provision of an improved device for controlling the movements of fish, so designed as to preclude the fish from entering areas, such, for example, as irrigation ditches, when water from the stream or river, or the like, is admitted thereto through gates, normally closing the irrigation ditches.

An additional object of the invention is the provision of an improved apparatus of such character adapted to permit free passage of water through the gates, but provided with a device for producing an impact in the water adjacent the area, so designed as to startle or scare away the fish from the entrance to the restricted area.

Another object of the invention is the provision of such device adapted to be operated solely by the passage of the water through the restricted area.

Still another object is the provision of such device having means associated therewith, operable on passage of water therethrough, adapted to produce a relatively sharp striking sound at periodic, frequent intervals, serving to cause the fish to leave the area of the impact.

Other objects reside in the combinations of elements, arrangements of parts, and details of construction, all as will be more fully pointed out hereinafter and shown in the accompanying drawings, wherein there is disclosed a preferred embodiment of this inventive concept.

Having reference now to the drawings, wherein there is disclosed a preferred embodiment of this inventive concept, Figure 1 is a side elevational view of one form of device embodying features of this inventive concept.

Figure 2 is a top plan view of the device shown in Figure 1.

Figure 3 is an elevational end view of the device of Figure 1, certain parts thereof being shown in section, as viewed from one end.

Figuer 4 is an end elevational view of the device of Figure 1, as viewed from the opposite end.

Figure 5 is a side elevational view of a constructional element.

Figure 6 is a top plan view of the element shown in Figure 5.

Figure 7 is an end elevational view of the device shown in Figures 5 and 6, various positions of adjustment being indicated by dotted lines.

Figure 8 is an enlarged fragmentary view of an additional constructional detail.

Figure 9 is an enlarged perspective view, partially broken away, showing the apparatus for operating the striker arm, and Figure 10 is a view similar to Figure 9 but disclosing the parts in a different position of adjustment.

Like reference numerals refer to like parts throughout the several views of the drawings.

Having reference now to the drawings, there is generally indicated at 10 a member adapted to be positioned in a sluiceway or irrigation ditch, or the like, comprised of side walls 11 and 12 and a barrier member 13 positioned transversely thereacross, provided in its face with an aperture 14 having channels 15 positioned along the longitudinal edges thereof (see Fig. 4), within which is slidably positioned a gate 16 provided with an extending portion 17 and a transverse handle member 18, adapted to be opened and closed to admit water through the barrier 13 by moving the same upwardly or downwardly.

Means are provided adjacent aperture 14 for startling or scaring away fish from the area, and precluding their passage thereinto when gate 16 is open. Such means take the form of a transverse sleeve 20 (see Fig. 3) secured, as by brackets 21, to one face of the barrier member 13. Sleeve 20 has pivotally secured thereto a U-shaped member, generally indicated at 23, comprised of two parallel extending portions 24 and 25 and a transverse portion 26. Secured to transverse portion 26 is a weight 27 adapted to hold the parts in horizontal position, as indicated in the drawings, suitable stop members 28 being provided to prevent passage of the part beyond horizontal.

If desired, a rope or cable 30, or the like, may be secured to weight 27, in order to lift the same and its associated member 23 upwardly about the pivots formed in the ends of sleeve 20.

Positioned between the members 24 and 25 is a rotatable axle 31 on which is mounted a paddle wheel 32, or the like, adapted to be rotated by the passage of the water thereover. One end of sleeve 31 is provided with an extending portion, to which is secured a sprocket 33, adapted to drive a chain 34 which in turn rotates a sprocket 35, secured to one end of an axle 36 which extends inwardly through sleeve 20. The opposite end of axle 36 is provided with a bevel gear 37 which in turn drives a second bevel gear 38 (see Fig. 3), which drives an axle 39 extending upwardly through a sleeve 40, and terminating in a sprocket 41, the upper end of the shaft 39 being secured to the base of member 13, as by a bracket 42.

Pulley 41 drives a chain 45 which extends through an aperture 46 in member 13 to a sprocket 47, mounted on a stub axle 48 secured, as by a bracket 49, to the opposite face of member 13 as thus seen in Figures 9 and 10.

To the lower end of the stub axle 48 is secured a depending heavy wire 50 which is bent to form a laterally extending loop 51. A plate 52 is formed with the laterally extending upper and lower apertured flanges 53 which are connected together by means of the spaced rods 54 and said plate is supported upon the wire 50 above and below said loop 51, in such a manner that the plate 52 will be engaged and rotated by the loop 51 when it is rotated in either direction. An upper bent extremity 65 is formed on the rod 66 which is rotatably mounted in the bracket 67 secured to the plate 13, and is adapted to be periodically engaged by the plate 52 which is connected with the paddle wheel 32 and operated thereby. The lower end 66a of the rod 66 is bent to underlie the bent extremity 65 at the upper end of said rod, and supports a block or head member 68 on its extremity. The bracket 70 is secured by the fasteners 71 to the base of the plate 13 adjacent the aperture 14 formed therethrough, and supports the block or head member similar to the member 68. The rotation of the plate 52 by means of the paddle wheel 32 will therefore cause the block or head member 68 to repeatedly strike against the similar head member 69 fixed upon the bracket 70 to cause a series of sharp impacts as vibrations will travel through the water to scare the fish away from the aperture 14. Obviously, the spring 60 attached to the bent extremity 65 will increase or resiliently tension the striking action of the movable head 68 upon the similar fixed head 69.

From the foregoing the operation of the device should now be readily understandable. When the gate is opened, and the member 23 lowered into the water, the movement of the water effects rotation of the paddle wheel 32, which, through sprocket 33, chain 34 and sprocket 35, rotates through gears 37 and 38 shaft 39, to drive pulley 41, chain 45 and sprocket 47. Such rotation of the sprocket 47 in turn rotates shaft 48 which moves, through wire 50, the rectangular portion comprised of plate 52 and bars 54 to rotate the same. Such rotation acts upon the inturned end 65 of rod 66, causing the same to be rotated against the bias of spring 60 in a direction to displace hammer 68 with respect to hammer 69. As the rectangular member continues to rotate from the position shown in Figure 9 to that shown in Figure 10, the plate, when it passes the position at right angles to end 65 shown in Figure 10, is snapped out of position by spring member 60, which in turn permits the resilient wire 66 to snap back into position, bringing hammer 68 against fixed hammer 69 with a relatively sharp impact. Further rotation of shaft 59 causes the bent portion 51 to again engage plate 52 to rotate the same and repeat the operation. The sound waves occasioned by the periodic impacts serve effectively to startle or scare away the fish in the vicinity of aperture 14, and consequently preclude the passage of the fish therethrough.

From the foregoing it will be seen that there is herein provided a device accomplishing all the objects of this invention and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

A device for scaring fish including an oscillatable rod having an actuating arm on its upper end and an actuating arm on its lower end, a striking head on said lower end, a fixed bracket, a similar striking head on said bracket engageable by said first-mentioned striking head, a continuously rotatable water flow actuated crank, an actuating plate rotatably mounted upon said crank for intermittent engagement thereby, said actuating plate, when engaged by said crank, having a wiping engagement with the upper actuating arm on said oscillatable rod for separating the first-mentioned striking head from the last-mentioned striking head and for providing a lost motion snap action of the actuating plate each time it is engaged by the water flow actuated crank with a subsequent causation of sharp impacts between said striking heads, and resilient means for tensioning the action of said movable striking head.

ALFRED NELSON.

REFERENCES CITED

The following references are of record in the file of this patent:

UNITED STATES PATENTS

| Number | Name | Date |
|---|---|---|
| 390,764 | Flaherty | Oct. 9, 1888 |
| 898,583 | Kimble | Sept. 15, 1908 |
| 1,596,310 | Samson | Aug. 17, 1926 |
| 1,080,415 | Chandler | Dec. 2, 1913 |
| 1,210,271 | Burgess | Dec. 26, 1916 |
| 1,234,894 | Fuller | July 31, 1917 |